US011505000B2

(12) United States Patent
Stoecker et al.

(10) Patent No.: US 11,505,000 B2
(45) Date of Patent: Nov. 22, 2022

(54) MODULAR DRIVE SYSTEM FOR A MACHINE

(71) Applicant: Caterpillar Inc., Peoria, IL (US)

(72) Inventors: Randy Stoecker, Chillicothe, IL (US); Lance Sierer, Peoria, IL (US); Joshua Hicke, Glasford, IL (US)

(73) Assignee: Caterpillar Inc., Peoria, IL (US)

( * ) Notice: Subject to any disclaimer, the term of this patent is extended or adjusted under 35 U.S.C. 154(b) by 413 days.

(21) Appl. No.: 16/715,937

(22) Filed: Dec. 16, 2019

(65) Prior Publication Data

US 2021/0178813 A1 Jun. 17, 2021

(51) Int. Cl.
*B60B 35/00* (2006.01)
*B60K 7/00* (2006.01)
*H02K 7/00* (2006.01)
*B60K 1/00* (2006.01)

(52) U.S. Cl.
CPC .............. *B60B 35/006* (2013.01); *B60K 1/00* (2013.01); *B60K 7/0007* (2013.01); *H02K 7/003* (2013.01); *H02K 7/006* (2013.01)

(58) Field of Classification Search
CPC .. B60B 35/006; B60K 7/0007; B60K 17/043; B60K 2007/0092; H02K 7/003; H02K 7/006

See application file for complete search history.

(56) References Cited

U.S. PATENT DOCUMENTS

| | | | | |
|---|---|---|---|---|
| 2,082,001 A | * | 6/1937 | Hanson | B60K 17/356 180/65.6 |
| 3,055,448 A | * | 9/1962 | Fagel | B60K 17/145 180/10 |
| 3,897,843 A | * | 8/1975 | Hapeman | B60T 1/06 310/67 R |
| 5,127,485 A | * | 7/1992 | Wakuta | B60K 7/0007 310/67 R |
| 5,793,132 A | * | 8/1998 | Hirose | H02K 5/225 310/67 R |
| 7,147,073 B2 | * | 12/2006 | Mollhagen | B60K 17/046 180/65.6 |
| 7,325,643 B2 | * | 2/2008 | Shimizu | B60T 1/065 180/385 |
| 8,701,806 B2 | | 4/2014 | Ishii et al. | |
| 8,727,052 B2 | * | 5/2014 | Drum | B60K 17/046 180/55 |
| 2006/0002783 A1 | | 1/2006 | Rudduck et al. | |
| 2007/0102210 A1 | * | 5/2007 | Oshidari | B60K 7/0007 280/124.128 |
| 2007/0193794 A1 | * | 8/2007 | Johnston | E02F 9/207 180/65.31 |
| 2013/0307320 A1 | * | 11/2013 | Akamatsu | B60L 7/14 301/6.5 |
| 2019/0061504 A1 | | 2/2019 | Bassis | |
| 2019/0078675 A1 | | 3/2019 | Slesinski et al. | |
| 2019/0160366 A1 | | 5/2019 | Quick et al. | |
| 2019/0176618 A1 | | 6/2019 | Bassis | |

* cited by examiner

*Primary Examiner* — Frank B Vanaman
(74) *Attorney, Agent, or Firm* — Harrity & Harrity LLP

(57) ABSTRACT

A modular drive system may include a motor assembly that includes a motor housing with a motor subassembly bolt pattern. The modular drive system may include a brake assembly that includes a brake housing with a brake subassembly bolt pattern. The modular drive system may include a final drive assembly that includes a final drive flange with a final drive subassembly bolt pattern.

20 Claims, 10 Drawing Sheets

MODULAR DRIVE SYSTEM FOR A MACHINE

TECHNICAL FIELD

The present disclosure relates generally to a drive system of a machine and, for example, to a modular drive system for the machine.

BACKGROUND

A machine, such as a track-type tractor (e.g., an excavator, a bulldozer, and/or the like), may be configured to use a motor drive assembly that includes a final drive to mechanically engage with a ground engaging element (e.g., a track, a tire, and/or the like) of the machine. In some instances, multiple motor drive assemblies are configured to each individually drive multiple ground engaging elements of the machine. For example, for a given set of ground engaging elements of the machine, each ground engaging element of the set may be driven by an individual motor drive assembly. However, according to previous techniques, each motor drive assembly is separately configured or designed to be mounted to a frame of the machine based on which side of the machine the motor drive assembly is to be mounted. Furthermore, some motor drive assemblies include a plurality of separate parts. These separate parts may require separate maintenance, may require various types of passageways for operation (e.g., for lubrication, cooling, and/or the like), and/or various types of connections for control capabilities.

One approach for a modular motor gearbox unit and drive system is disclosed in U.S. Patent Publication No. 2019/0176618 that is assigned to NIO USA, Inc. (the "NIO reference"). In particular, the NIO reference describes first mount features and second mount features configured to interchangeably engage with and retain a single-motor drive unit and a multiple-motor drive unit via drive unit mount features of the single-motor drive unit and drive unit mount features of the multiple-motor drive unit.

While the modular motor gearbox and drive system of the NIO reference may allow for the first mount features and the second mount features to both be configured to interchangeably engage with and retain a single-motor drive unit and/or a multiple motor drive unit via the drive unit mount features of the single-motor drive unit and the drive unit mount features of the multiple-motor drive unit, the modular motor gearbox and drive system of the NIO reference is not associated with a track-type tractor (or other similar type of machine that uses a motor drive to steer the machine) and does not enable independent access or separation of components (e.g., a motor, a brake system, a final drive, and/or the like) of a motor drive assembly (e.g., that is mounted to a frame of a machine) and/or a plurality of motor drive assemblies to be installed coaxially on opposite sides of a machine.

The modular drive system of the present disclosure solves one or more of the problems set forth above and/or other problems in the art.

SUMMARY

According to some implementations, a motor drive assembly for a machine may include a motor assembly that includes a motor housing with a motor subassembly bolt pattern, wherein the motor subassembly bolt pattern permits the motor assembly to be fastened to a frame of the machine with motor subassembly bolts; a brake assembly that includes a brake housing with a brake subassembly bolt pattern, wherein a first portion of the brake subassembly bolt pattern matches a first portion of the motor subassembly bolt pattern to permit brake subassembly bolts to be received via the first portion of the brake subassembly bolt pattern and the first portion of the motor subassembly bolt pattern; and a final drive assembly that includes a final drive flange with a final drive subassembly bolt pattern, wherein a portion of the final drive subassembly bolt pattern matches a second portion of the brake subassembly bolt pattern to permit final drive subassembly bolts to be received via the second portion of the brake subassembly bolt pattern and the portion of the final drive subassembly bolt pattern.

According to some implementations, a frame of a machine that is capable of being driven by a motor drive assembly may include a first frame mount configuration on a first side of the frame; and a second frame mount configuration on a second side of the frame that is opposite the first side of the frame, wherein the second frame mount configuration is inverted relative to the first frame mount configuration so that the motor drive assembly of the plurality of motor drive assemblies can be mounted to the first side of the frame in a first orientation or the second side of the frame in a second orientation that is inverted relative to the first orientation, and wherein the first frame mount configuration and the second frame mount configuration include a fluid passageway for a motor assembly, a fluid passageway for a brake assembly, and a fluid passageway for a final drive assembly of the motor drive assembly.

According to some implementations, a machine may include a frame that includes a first frame mount configuration on a first side of the frame and a second frame mount configuration that is aligned with the first frame mount configuration on a second side of the frame that is opposite the first side of the frame; a first motor drive assembly mounted to the frame via the first frame mount configuration; and a second motor drive assembly mounted to the frame via the second frame mount configuration, wherein the first motor drive assembly and the second motor drive assembly have a same motor drive mount configuration, wherein the first frame mount configuration and the second frame mount configuration match a motor drive mount configuration; and wherein the second frame mount configuration is inverted relative to the first frame mount configuration so that the first motor drive assembly is inverted relative to the second motor drive assembly.

DETAILED DESCRIPTION

Figure 1:
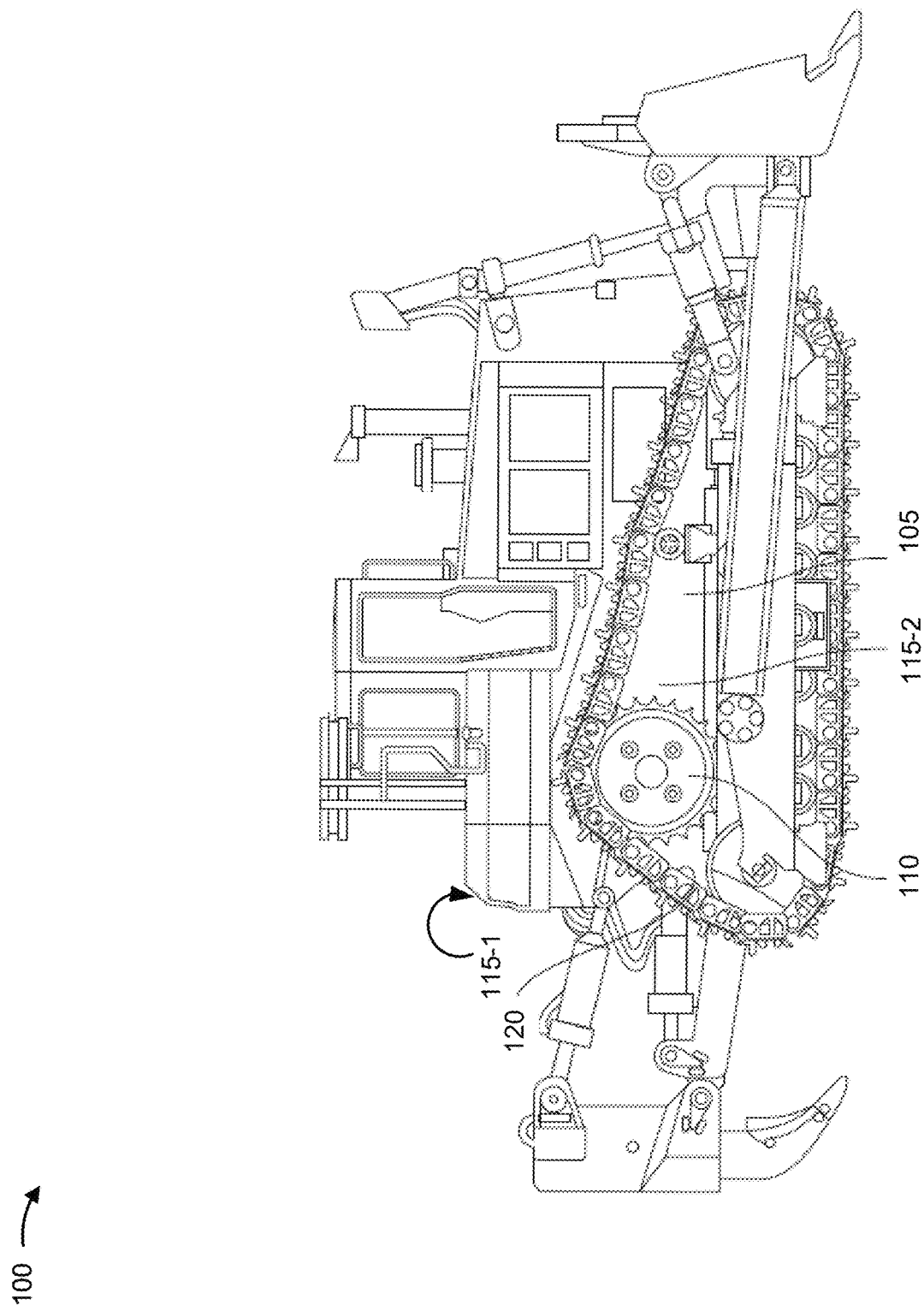
FIG. 1 is a side view of an example machine in which a modular drive system may be implemented.

FIG. 1 is a side view of an example machine 100 (shown as a track-type tractor) in which a modular drive system described herein may be implemented. Machine 100 may correspond to any work machine that performs one or more operations associated with one or more industries such as, for example, mining, construction, farming, transportation, paving, and/or the like.

As shown in FIG. 1, machine 100 includes a frame 105 that encloses a power source (e.g., a dual path electric powertrain described herein). A motor drive assembly of the machine 100, as described herein, may include final drive assemblies 110 that are attached to opposite sides, shown as left side 115-1 and right side 115-2 of frame 105 (and/or machine 100) to engage and support a corresponding track chain 120 or other similar ground engaging member. Machine 100 is propelled by movement of track chains 120 driven by rotation of final drive assemblies 110.

Machine 100 may include one or more electronic control modules (ECMs) associated with an internal combustion engine of machine 100. The ECM may provide power control, steering control, braking control, lubrication system control, coolant system control, hydraulic control, and/or the like to motor drive assemblies of machine 100.

As indicated above, FIG. 1 is provided as an example. Other examples may differ from what is described in connection with FIG. 1. In some implementations, machine 100 may include additional components, fewer components, different components, or differently arranged components than those shown in FIG. 1.

Figure 2:
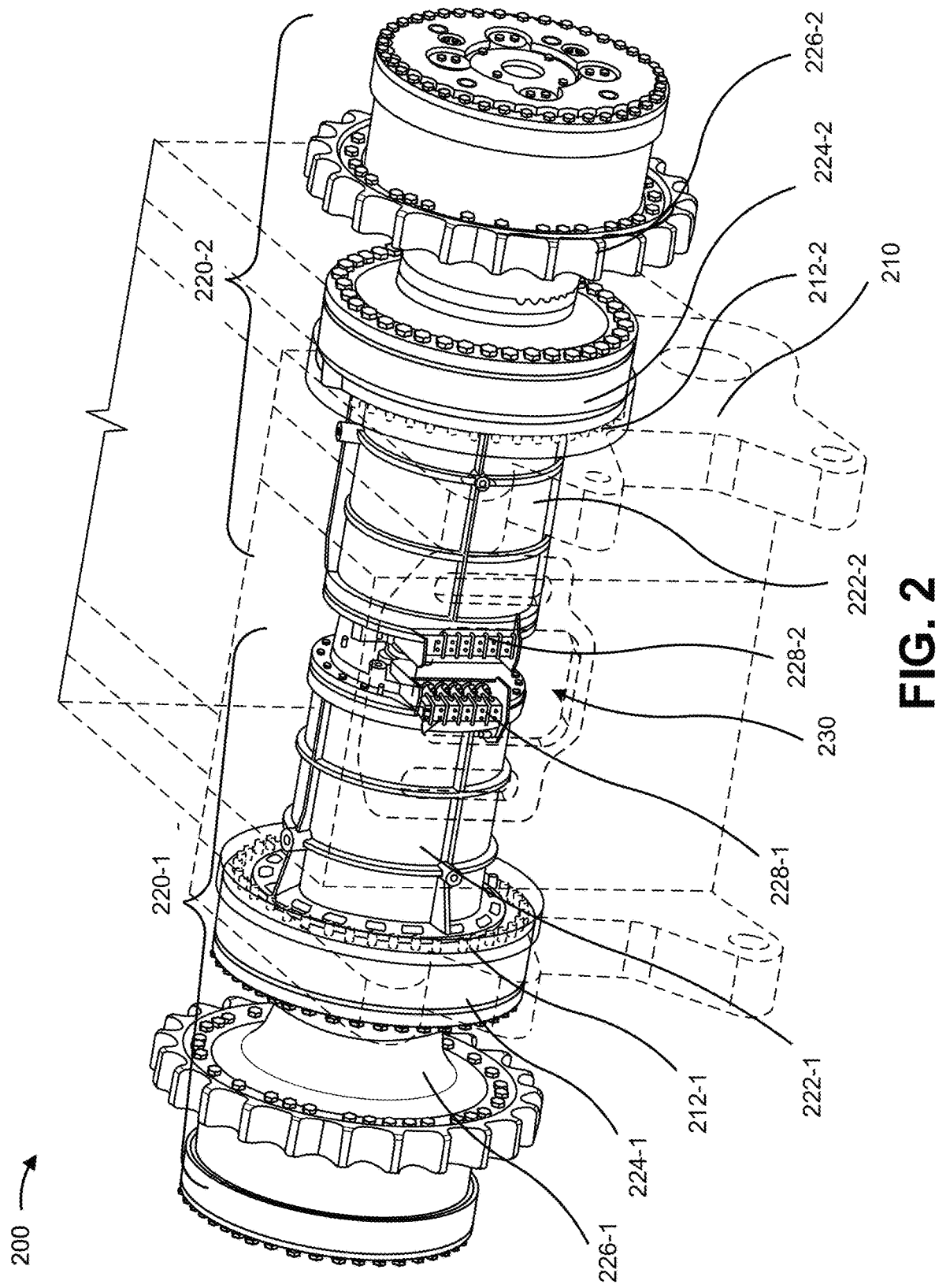
FIG. 2 is a diagram of an example implementation of a modular drive system described herein.

FIG. 2 is a diagram of an example implementation of a modular drive system 200 described herein. As shown in FIG. 2, modular drive system 200 includes a frame 210 (shown with dashed lines, and that may correspond to frame 105) with frame mount configurations 212 (shown as and referred to herein individually as a "left frame mount configuration 212-1" and a "right frame mount configuration 212-2"), motor drive assemblies 220 (shown as and referred to herein individually as a "left motor drive assembly 220-1" and a "right motor drive assembly 220-2"). Left motor drive assembly 220-1 is shown mounted (e.g., with fasteners such as bolts for mechanical attachment, electrical connections connected, fluid passageways adjoined, and/or the like) to left frame mount configuration 212-1, and right motor drive assembly 220-2 is shown mounted to right frame mount configuration 212-2. In one or more examples described herein, the modular drive system 200 may be included within machine 100.

The motor drive assemblies 220 may provide a dual path electric powertrain via a set of modular components. In FIG. 2, the modular components include motor assemblies 222 (shown as and referred to herein as a "left motor assembly 222-1" and a "right motor assembly 222-2"), brake assemblies 224 (shown as and referred to herein as a "left brake assembly 224"-1 and a "right brake assembly 224-2"), and final drive assemblies 226 (shown as and referred to herein as a "left final drive assembly 226-1" and a "right final drive assembly 226-2"). In examples described herein, left motor drive assembly 220-1 can be a same type of motor drive assembly as right motor drive assembly 220-2. Correspondingly, left motor assembly 222-1, left brake assembly 224-1, and left final drive assembly 226-1 may be a same type of motor assembly, brake assembly, and final drive assembly as right motor assembly 222-2, right brake assembly 224-2, and right final drive assembly 226-2, respectively. Multiple components are considered to be a same type based on being associated with a same make/manufacture, being identified by a same model number (or serial number, part number, etc.), having the same dimensions, having the same design or performance specifications, and/or the like. Accordingly, as described herein, motor drive assemblies 220 have a same mounting configuration, including the same bolt patterns, electrical connections, fluid passageways, and/or the like to provide power, fluids, and/or control to the components of the motor drive assemblies. For example, as shown, left motor drive assembly 220-1 may include a left terminal block 228-1 and right motor drive assembly 220-2 may include a right terminal block 228-2 (referred to collectively as "terminal blocks 228"). Terminal blocks 228 of the motor drive assemblies 220 may be positioned on or toward an inner edge of the motor drive assemblies 220.

As described herein, left frame mount configuration 212-1 and right frame mount configuration 212-2 are configured to permit left motor drive assembly 220-1 to be mounted to right frame mount configuration 212-2 and/or right motor drive assembly 220-2 to be mounted to left frame mount configuration 212-1. However, to enable such interchangeability and/or to enable a limited number of different motor drive assemblies to be used with frame 210, frame 210 left frame mount configuration 212-1 may be inverted relative to right frame mount configuration 212-2. For example, corresponding holes of bolt patterns, corresponding electrical connections, corresponding fluid passageways (e.g., for lubricants, coolants, hydraulic fluid, and/or the like), and/or the like of frame mount configurations 212 may be symmetrical (or mirrored) relative to a central plane of frame mount configurations 212. Furthermore, a center axis of left frame mount configuration 212-1 and a center axis of right frame mount configuration 212-2 may be aligned and/or parallel to a rotational axis of motor drive assemblies 220 (e.g., a rotational axis that includes a rotor shaft and/or axle of motor drive assemblies 220). Accordingly, either of motor drive assemblies 220 can be mounted to left frame mount configuration 212-1 in a first orientation (e.g., upright) or right frame mount configuration 212-2 in a second orientation (e.g., inverted).

As shown in FIG. 2, frame 210 includes an access opening 230 to permit access for electrical connections of the left motor drive assembly 220-1 and right motor drive assembly 220-2. The access opening 230 may be centered between left frame mount configuration 212-1 and right frame mount configuration 212-2 to permit user access to electrical terminals of terminal blocks 228. Because the left frame mount configuration 212-1 is inverted relative to the right frame mount configuration 212-2, the left motor drive assembly 220-1, when mounted, is inverted relative to the right motor drive assembly 220-2. Accordingly, the left terminal block 228-1 and right terminal block 228-2, when motor drive assemblies 220 are mounted on frame 210 as shown, will align with access opening 230. As shown, access opening 230 is open toward a rear of machine 100, which may include more available space for user access than a front of machine 100 due to a generator, engine, or other components in certain configurations toward the front of machine 100.

As indicated above, FIG. 2 is provided as an example. Other examples may differ from what is described with regard to FIG. 2. In some implementations, modular drive system 200 may include additional components, fewer components, different components, or differently arranged components than those shown in FIG. 2.

Figure 3:
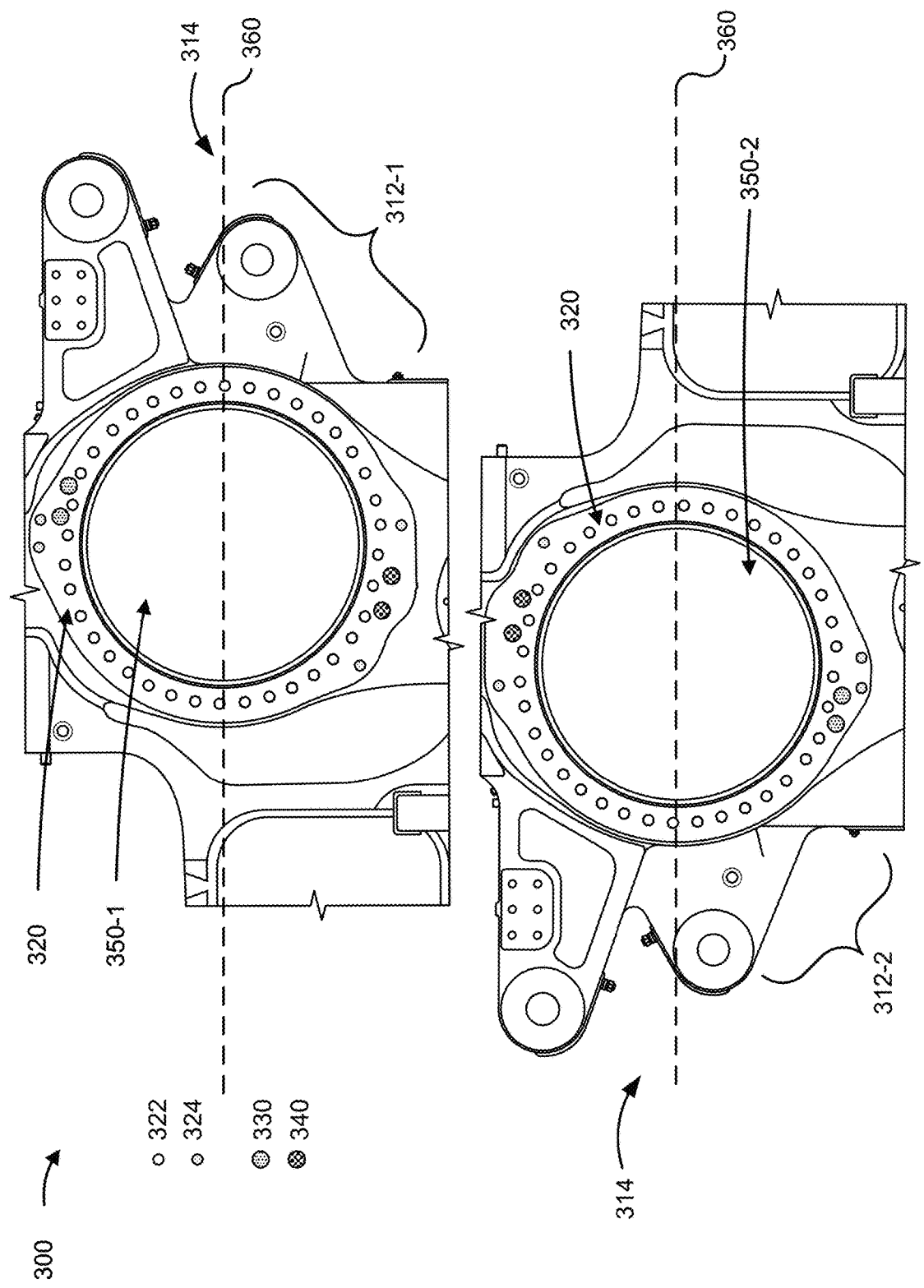
FIG. 3 is a diagram of an example implementation of a frame of a modular drive system described herein.

FIG. 3 is a diagram of an example implementation of a frame 300 of a modular drive system (e.g., modular drive system 200) described herein. Frame 300 may correspond to frame 210 of FIG. 2 and/or frame 105 of machine 100. As shown, a left side 310-1 and a right side 310-2 of frame 300 are shown to include to each include frame mount configurations 312 (shown as and referred to herein as "a left frame mount configuration 312-1" and "a right frame mount configuration 312-2"). Frame mount configurations 312 may be positioned toward a rear end 314 of frame 300 and, correspondingly, a rear end of a machine (e.g., machine 100).

In FIG. 3, left frame mount configuration 312-1 and right frame mount configuration 312-2 include a same bolt pattern 320 with an assembly bolt pattern 322 (shown with white-filled holes) and subassembly bolt pattern 324 (shown with gray-filled holes), a same lubricant passageway configuration 330 (shown with dotted-filled holes), a same hydraulic fluid passageway configuration 340 (shown with checkered-filled holes), and a motor opening 350 (shown as and referred to herein as "left motor opening 350-1" and "right motor opening 350-2").

As shown, holes of the bolt pattern 320 are provided around a periphery of a left motor opening 350-1 of left frame mount configuration 312-1 and a right motor opening 350-2 of right frame mount configuration 312-2. Motor drive assemblies 220 are fit within motor openings 350 (e.g., bore(s) of frame 300) and positioned to align with corresponding holes and/or passageways of frame mount configurations 312. As described herein, subassembly bolt pattern 324 receives motor subassembly bolts to mount a motor assembly (e.g., motor assembly 222) to frame 300, and assembly bolt pattern 322 receives assembly bolts to mount a motor drive assembly (e.g., mount motor drive assembly 220) to frame 300. The holes of subassembly bolt pattern 324 and/or assembly bolt pattern 322 may be threaded and/or sized to receive corresponding subassembly bolts for subassembly of the motor assembly and/or assembly bolts of the motor drive assembly.

In FIG. 3, left frame mount configuration 312-1 and right frame mount configuration 312-2 are inverted relative to a central plane 360. The central plane 360 may correspond to any plane that intersects or runs through a rotational axis of the motor drive assemblies 220. In this way, central plane 360 may be parallel to the rotational axis, at an offset angle from the rotational axis, or perpendicular to the rotational axis. Accordingly, a same motor drive assembly can be installed on either a left side 310-1 of frame 300 via left frame mount configuration 312-1 or a right side 310-2 of frame 300 via right frame mount configuration 312-2.

As indicated above, FIG. 3 is provided as an example. Other examples may differ from what is described with regard to FIG. 3.

Figure 4:
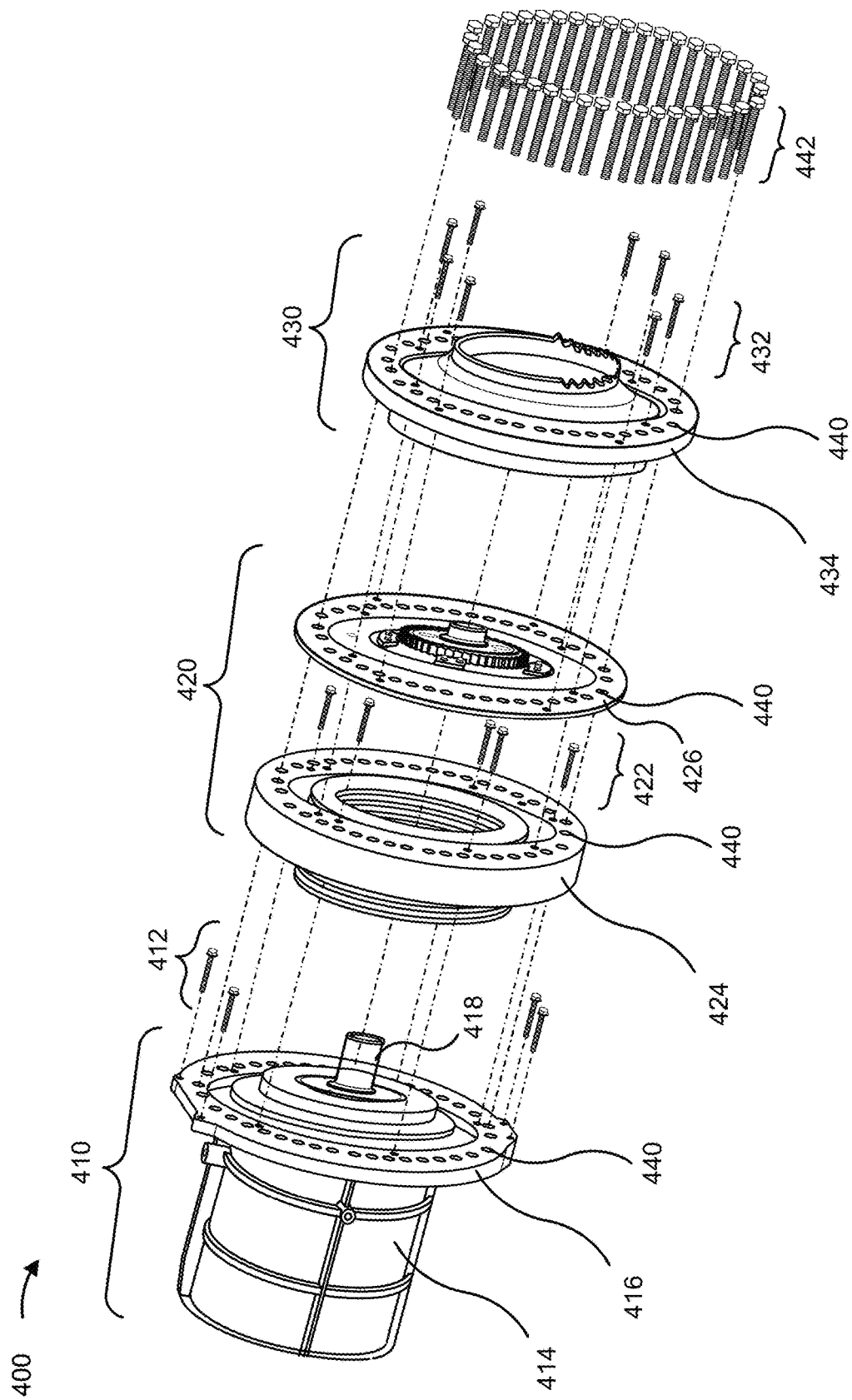
FIG. 4 is an exploded view diagram of an example motor drive assembly described herein.

FIG. 4 is an exploded view diagram of an example motor drive assembly 400 described herein. Motor drive assembly 400 may correspond to motor drive assemblies 220 of FIG. 2. As shown, motor drive assembly 400 includes a motor assembly 410 (shown as a portion of motor assembly 222), a brake assembly 420 (corresponding to brake assembly 224), and a final drive assembly 430 (shown as a portion of final drive assembly 226). Motor drive assembly 400 may be one of a plurality of motor drive assemblies that can be installed (e.g., mounted for use within a frame, such as frame 300) on machine 100 to enable movement and/or control of machine 100.

As used herein, components are "mechanically coupled" when the components are attached to (e.g., fastened to via one or more fasteners or couplings, fit to, adhered to, and/or the like) and/or in contact with one another directly (without any intervening components other than fasteners or component-specific couplings, such as bearing assemblies, fittings, thread assemblies, and/or the like) or attached to each other and/or contact with one another via one or more intervening parts. Further, as used herein, components are "mechanically connected" when the components are attached to (or fastened to) one another and/or in contact with one another without any intervening components (other than fasteners or component-specific-couplings).

Motor assembly 410 may be fastened (e.g., in a subassembly or assembly of motor drive assembly 400) to frame 105 via motor subassembly bolts 412. For example, motor subassembly bolts 412 may be received through holes of a motor subassembly bolt pattern (e.g., as described in connection with FIG. 5) of a motor housing 414 into a corresponding subassembly bolt pattern of frame 105 (e.g., subassembly bolt pattern 324 of FIG. 3). Motor housing 414 may provide a close fit or a press fit engagement between motor assembly 410 and brake assembly 420.

Motor housing 414 may have a substantially cylindrical body portion and a motor assembly flange 416. The body portion of motor housing 414 is sized and shaped to be received in a final drive bore (e.g., with a cylinder having a diameter that is less than motor opening 350) of frame 105 of machine 100. Motor assembly flange 416 is sized and shaped to abut an outer mounting surface of a frame mount configuration (e.g., frame mount configuration 312) of frame 105 surrounding the final drive bore. Furthermore, motor assembly flange 416 may be sized and/or shaped to abut against a proximal mounting surface of brake housing 424.

Motor assembly 410 includes an electric motor that provides rotational movement to final drive assembly 430 via a rotor shaft 418. Specifications and/or performance characteristics associated with the rotational movement provided by motor assembly 410 may depend on the size and/or the purpose of machine 100. The electric motor of motor assembly 410 may be a high-torque, switched reluctance motor that is housed within motor housing 414 (e.g., such that a rotor and stator of the electric motor are within (or do not extend beyond) motor housing 414).

Rotor shaft 418 of motor assembly 410 extends beyond motor assembly flange 416 and may be mechanically coupled with and provide rotational movement to final drive assembly 430 (e.g., to rotate an axle and/or sprocket of final drive assembly 430, which drives track chain 120). Rotor shaft 418 may engage a gear assembly that connects with and provides rotational movement to an axle of final drive assembly 430. Final drive assembly 430 may, in turn, cause movement of track chain 120 based on the rotational movement of the axle. Rotor shaft 418 may be shortened, compared to such shafts provided in current powertrain solutions, to reduce a width of motor drive assembly 400 and/or to accommodate provision of brake assembly 420 outside of frame 105.

Figure 5:
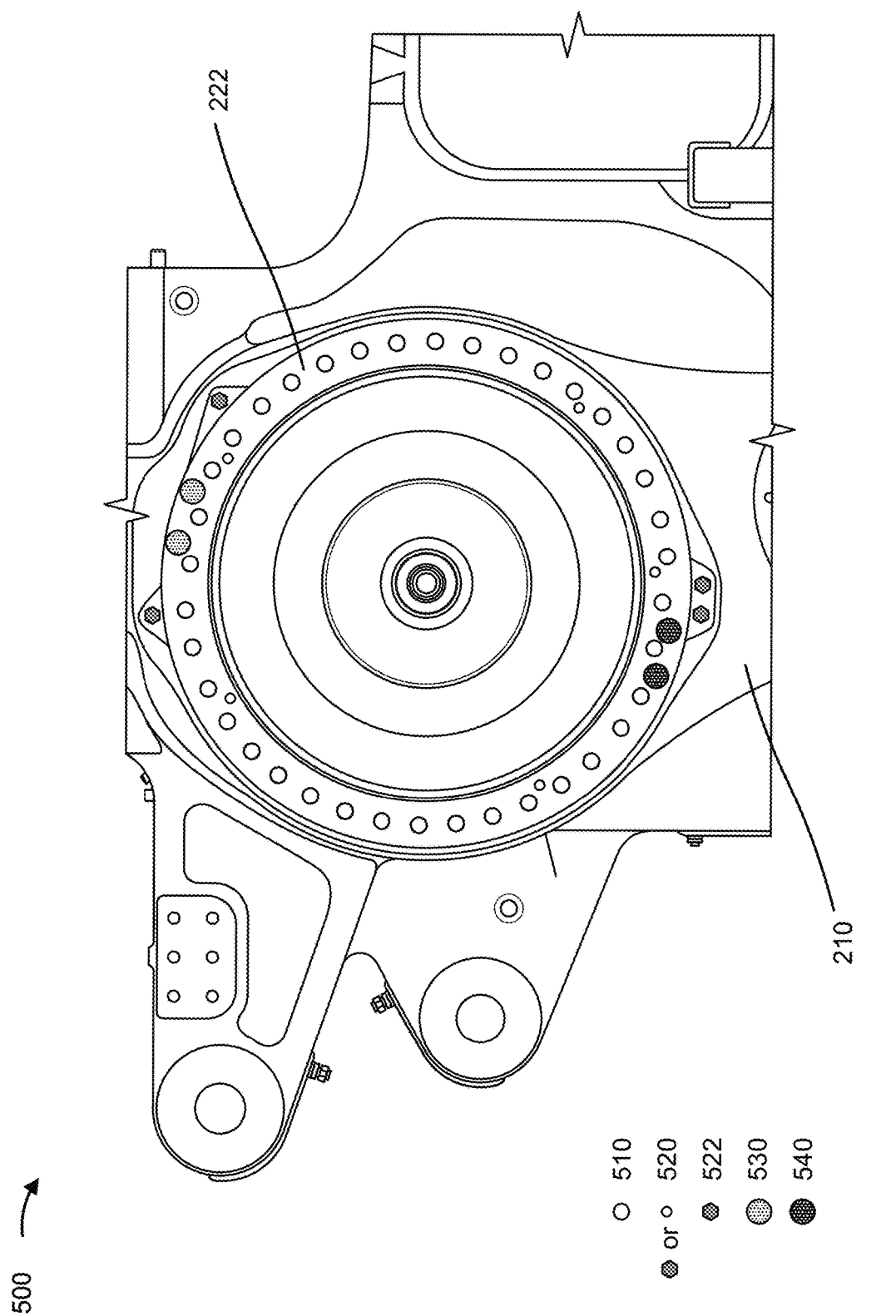
FIGS. 5, 6, 7, 8, and 9 are diagrams of one or more example bolt patterns of an example motor drive assembly described herein.

Brake assembly 420 may be fastened to motor assembly 410 via brake subassembly bolts 422. For example, brake subassembly bolts 422 may be received through holes of a brake subassembly bolt pattern (e.g., as described in connection with FIG. 6) of a brake housing 424 into a corresponding subassembly bolt pattern of motor assembly 410 (e.g., as shown in FIG. 5). Brake housing 424 provides a close fit or a press fit engagement between brake assembly 420 and motor assembly 410 and/or between brake assembly 420 and final drive assembly 430.

Brake housing 424 is sized and shaped to match a size and shape of motor assembly flange 416 and/or a mounting surface of final drive assembly 430. Furthermore, brake assembly 420 includes a spring retainer plate 426 to enclose brake housing 424 and/or enclose one or more components (e.g., a spring) of brake assembly 420 within brake housing 424. As shown, brake subassembly bolts 422 may be received through brake housing 424. According to some implementations, brake subassembly bolts 422 may be received through brake housing 424 and spring retainer plate 426. In such a case, spring retainer plate 426 may include a brake subassembly bolt pattern that matches the brake subassembly bolt pattern of brake housing 424.

Brake assembly 420 may include a brake pack (e.g., a brake pack of a wet-disc brake system) that reduces rotational speed of a rotor shaft 418 of motor assembly 410 (e.g., provide a braking force to motor assembly 410). Brake assembly 420 (e.g., via a gear assembly) may receive and mechanically couple adjoining ends of rotor shaft 418 and an axle of final drive assembly 430. Brake assembly 420 may be configured to be positioned outside of frame 105 of machine 100 (e.g., in order to reduce space occupied by motor drive assembly 400). In this way, motor drive assembly 400 provides a compact arrangement that does not require modification of frame 105 of machine 100. Specifications and performance characteristics of brake assembly 420 may depend on a size and/or a purpose (e.g., loading, hauling, moving, and/or the like) of machine 100.

Brake assembly 420 may include a planetary gear assembly, which may enable motor drive assembly 400 to be more compact (e.g., have a shorter overall length, diameter, and/or the like) than a motor drive assembly without such a planetary gear assembly. For example, the planetary gear reduction may include a sun-in, carrier out gear assembly that is situated, within motor drive assembly 400, between motor assembly flange 416 and spring retainer plate 426. The planetary gear assembly may provide a gear reduction from rotor shaft 418 to an axle of final drive assembly 430.

Final drive assembly 430 may be fastened to brake assembly 420 via final drive subassembly bolts 432. For example, final drive subassembly bolts 432 may be received through holes of a final drive subassembly bolt pattern of a final drive flange 434 of final drive assembly 430. Final drive flange 434 may provide a close fit or a press fit engagement between final drive assembly 430 and spring retainer plate 426 of brake assembly 420. In some implementations (e.g., when spring retainer plate 426 is assembled or formed in conjunction with brake housing 424), final drive flange 434 may provide a close fit or a press fit engagement between final drive assembly 430 and brake housing 424 (and/or spring retainer plate 426) of brake assembly 420. Final drive flange 434 of final drive assembly 430 may be sized and shaped to align with brake assembly 420 and/or motor assembly flange 416 of motor assembly 410.

Final drive assembly 430 includes one or more components (e.g., components of a final drive gear assembly, a sprocket, and/or the like) to engage ground engaging elements (e.g., chain 120) of machine 100 via rotational movement of an axle of final drive assembly 430 that is driven by motor assembly 410 and/or slowed by brake assembly 420.

Motor drive assembly 400 includes an assembly bolt pattern 440 that is configured to receive assembly bolts 442 for operational use. As shown, multiple holes are sized and positioned in each of motor assembly flange 416, brake housing 424, spring retainer plate 426, and final drive flange 434 to correspondingly align around a final drive bore on a mounting surface of frame 105 (e.g., similar to assembly bolt pattern 322). Accordingly, assembly bolt pattern 440 and assembly bolts 442 are utilized to mount final drive assembly 430, brake assembly 420, and motor assembly 410 to frame 105 using multiple fasteners (e.g., bolts, nuts, screws, and/or the like).

As indicated above, FIG. 4 is provided as an example. Other examples may differ from what is described with regard to FIG. 4. In some implementations, motor drive assembly 400 may include additional components, fewer components, different components, or differently arranged components than those shown in FIG. 4. For example, motor drive assembly 400 may include one or more gearsets (e.g., to adjust a gear ratio between a rotational output of motor assembly 410 and an axle of final drive assembly 430).

FIGS. 5-9 are diagrams of one or more example bolt patterns of an example motor drive assembly (e.g., motor drive assembly 220) described herein. Bolts (or other types of fasteners) of the example bolt patterns of FIGS. 5-9 are described as being installed within a particular sequence to enable modular assembly and/or installation of the motor drive assembly 220. However, the example bolt may be installed within corresponding bolt patterns in any suitable sequence to allow modular assembly or disassembly of components of motor drive assembly 220. Accordingly, the example bolt patterns of FIGS. 5-9 may permit motor assembly 222, brake assembly 224, and/or final drive assembly 226 to be fastened to frame 210, and/or may permit a combination of motor assembly 222, brake assembly 224, and final drive assembly 226 to be mounted to frame 210.

FIG. 5 includes a diagram of an example motor mount configuration 500 of motor assembly 222 that includes an assembly bolt pattern 510 and a motor subassembly bolt pattern 520. Assembly bolt pattern 510 may receive assembly bolts to permit motor assembly 222 to be assembled within motor drive assembly 220 and/or to be mounted to frame 210 (e.g., via assembly bolt pattern 322 of frame mount configuration 312).

Various sets of holes of motor subassembly bolt pattern 520 are configured to receive various sets of subassembly bolts, as described herein. For example, a first set of holes of motor subassembly bolt pattern 520 are shown to have received motor subassembly bolts 522 to enable motor assembly 222 to be attached to frame 210 (e.g., without assembly bolts being installed and/or without brake assembly 224 being attached to motor assembly 222). Accordingly, a portion of motor subassembly bolt pattern 520 match a frame mount configuration (e.g., frame mount configuration 312) of frame 210. Another set of holes of motor subassembly bolt pattern 520 may receive brake subassembly bolts (shown in FIG. 6) to enable attachment of brake assembly 224 to motor assembly 222 (e.g., without assembly bolts being installed and/or without final drive assembly 226 being attached to brake assembly 224).

As further shown in FIG. 5, lubricant passageways 530 and hydraulic fluid passageways 540 are included in motor mount configuration 500. Lubricant passageways 530 may include a supply line and a return line for a coolant and/or lubricant, such as oil, for motor assembly 222, brake assembly 224, and/or final drive assembly 226. Hydraulic fluid passageways 540 may include a supply line and return line (e.g., to or from a hydraulics system of machine 100) for hydraulic fluid for brake assembly 224 (e.g., to hydraulically apply braking to motor drive assembly 220).

Figure 6:
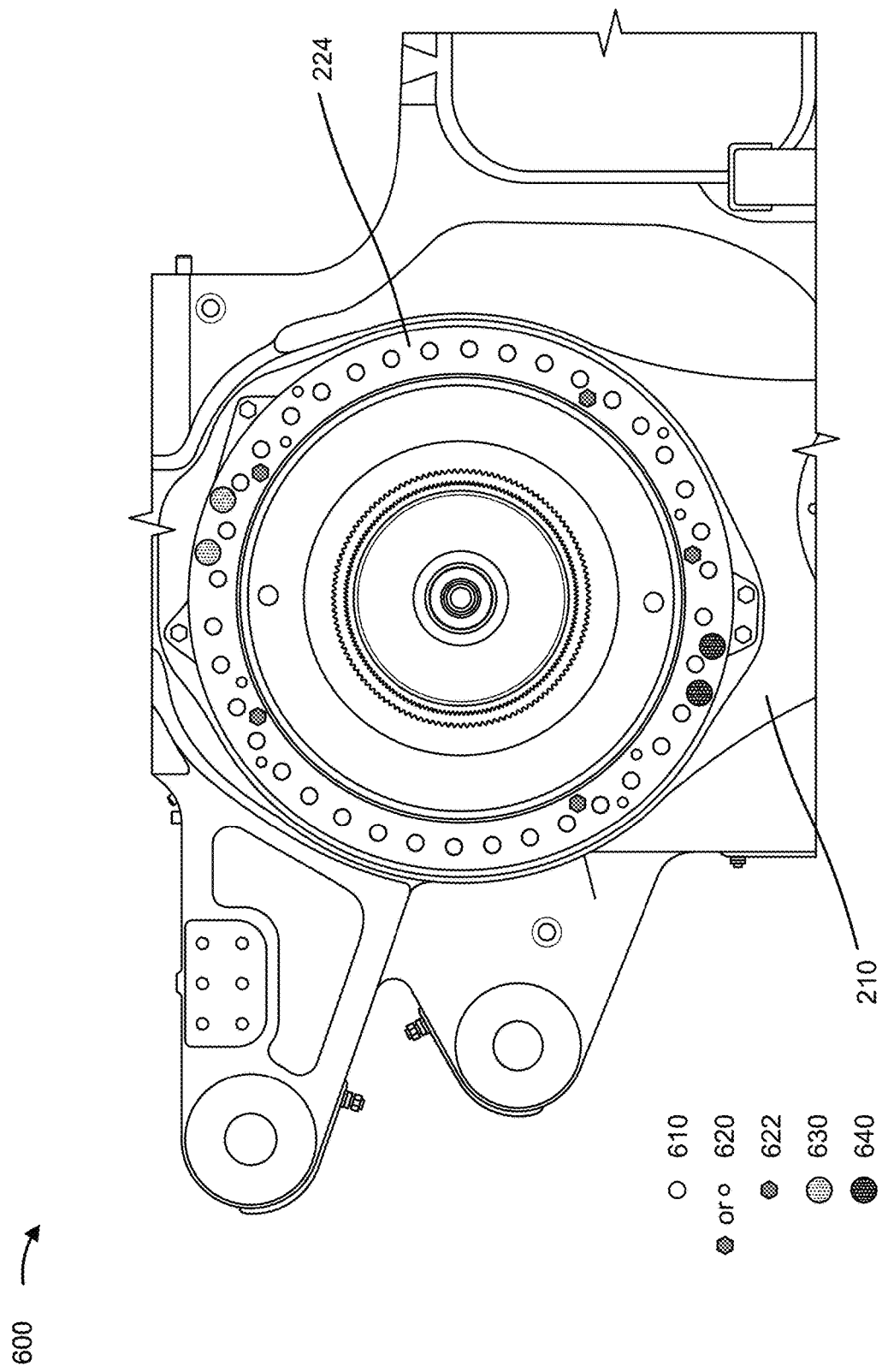

FIG. 6 includes a diagram of an example brake mount configuration 600 of brake assembly 224. Brake mount configuration 600 includes an assembly bolt pattern 610 (e.g., that matches assembly bolt pattern 510) and a brake subassembly bolt pattern 620. Assembly bolt pattern 610 may receive assembly bolts to permit brake assembly 224 to be assembled within motor drive assembly 220 and/or mounted to frame 210 (e.g., via assembly bolt pattern 322 of frame mount configuration 312).

Various sets of holes of brake subassembly bolt pattern 620 are configured to receive various sets of subassembly bolts, as described herein. For example, a first set of holes of brake subassembly bolt pattern 620 may receive brake subassembly bolts 622 to enable brake assembly 224 (or at least a brake housing of brake assembly 224) to be attached to frame 210 (e.g., without assembly bolts being installed and/or without final drive assembly 226 being attached to brake assembly 224). Accordingly, a portion of brake subassembly bolt pattern 620 match a portion of motor subassembly bolt pattern 520. Another set of holes of brake subassembly bolt pattern 620 may receive spring retainer plate subassembly bolts (shown in FIG. 7) to enable attachment of a spring retainer plate of brake assembly 224 (e.g., without assembly bolts being installed and/or without final drive assembly 226 being attached to brake assembly 224). Accordingly, a portion of brake subassembly bolt pattern 620 may match a portion of a spring retainer plate subassembly bolt pattern. Additionally, or alternatively, another set of holes of brake subassembly bolt pattern 620 may receive final drive subassembly bolts (shown in FIG. 8) to enable attachment of final drive assembly 226 to brake assembly 224 (e.g., without assembly bolts being installed). Accordingly, a portion of brake subassembly bolt pattern 620 may match a portion of a final drive subassembly bolt pattern.

As further shown in FIG. 6, lubricant passageways 630 and hydraulic fluid passageways 640 are included in brake mount configuration 600. Lubricant passageways 630 may include a supply line and a return line for a lubricant for final drive assembly 226. Hydraulic fluid passageways 640 may include a supply line and return line for hydraulic fluid for brake assembly 224.

FIG. 6 includes a diagram of an example brake mount configuration 600 of brake assembly 224. Brake mount configuration 600 may include an assembly bolt pattern 610 (e.g., that matches assembly bolt pattern 510) and a brake subassembly bolt pattern 620. Assembly bolt pattern 610 may receive assembly bolts to permit brake assembly 224 to be assembled within motor drive assembly 220 and/or mounted to frame 210 (e.g., via assembly bolt pattern 322 of frame mount configuration 312).

Various sets of holes of brake subassembly bolt pattern 620 are configured to receive various sets of subassembly bolts, as described herein. For example, a first set of holes of brake subassembly bolt pattern 620 may receive brake subassembly bolts 622 to enable brake assembly 224 (or at least a brake housing of brake assembly 224) to be attached to frame 210 (e.g., without assembly bolts being installed and/or without final drive assembly 226 being attached to brake assembly 224). Another set of holes of brake subassembly bolt pattern 620 may receive spring retainer plate subassembly bolts (shown in FIG. 7) to enable attachment of a spring retainer plate of brake assembly 224 (e.g., without assembly bolts being installed and/or without final drive assembly 226 being attached to brake assembly 224). Accordingly, a portion of brake subassembly bolt pattern 620 may match a portion of a spring retainer plate subassembly bolt pattern. Additionally, or alternatively, another set of holes of brake subassembly bolt pattern 620 may receive final drive subassembly bolts (shown in FIG. 7) to enable attachment of final drive assembly 226 to brake assembly 224 (e.g., without assembly bolts being installed). Accordingly, a portion of brake subassembly bolt pattern 620 may match a portion of a final drive subassembly bolt pattern (shown in FIG. 8).

As further shown in FIG. 6, lubricant passageways 630 and hydraulic fluid passageways 640 are included in motor mount configuration 500. Lubricant passageways 630 may include a supply line and a return line for a lubricant, such as oil for final drive assembly 226. Hydraulic fluid passageways 640 may include a supply line and return line for hydraulic fluid for brake assembly 224.

Figure 7:
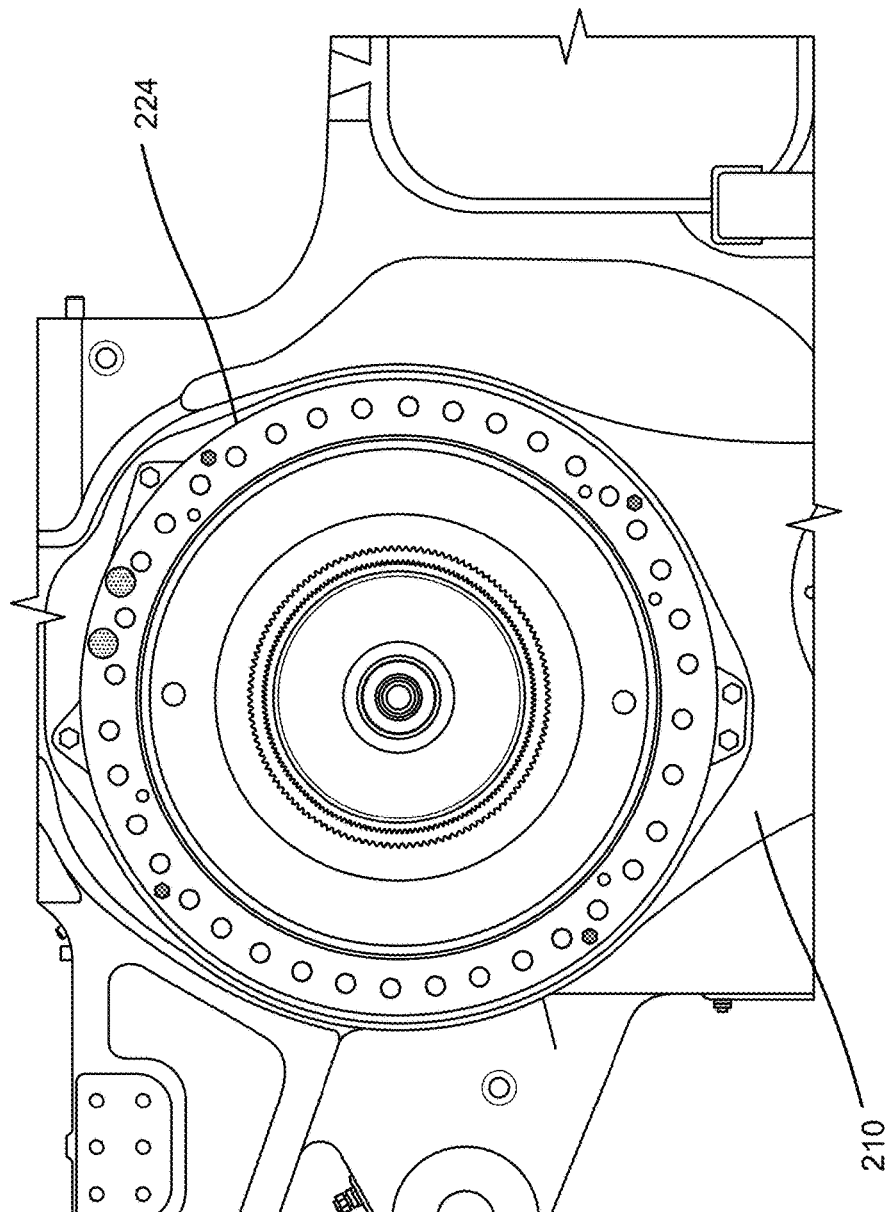

FIG. 7 includes a diagram of an example spring retainer plate mount configuration 700 of brake assembly 224. Spring retainer plate mount configuration 700 includes an assembly bolt pattern 710 (e.g., that matches assembly bolt pattern 510 and assembly bolt pattern 610) and a spring retainer plate subassembly bolt pattern 720. Assembly bolt pattern 710 may receive assembly bolts to permit a spring retainer plate retain internal brake components or form brake assembly 224 and/or permit brake assembly 224 to be mounted to frame 210 (e.g., via assembly bolt pattern 322 of frame mount configuration 312).

Various sets of holes of spring retainer plate subassembly bolt pattern 720 are configured to receive various sets of subassembly bolts, as described herein. For example, a first set of holes of spring retainer plate subassembly bolt pattern 720 may receive spring retainer plate subassembly bolts 722 to retain a spring of brake assembly 224 and/or enable brake assembly 224 to be formed. Another set of holes of spring retainer plate subassembly bolt pattern 720 may receive final drive subassembly bolts (shown in FIG. 8) to enable attachment of final drive assembly 226 to brake assembly 224 (e.g., without assembly bolts being installed). Accordingly, a portion of spring retainer plate subassembly bolt pattern 720 may match a portion of a final drive subassembly bolt pattern.

As further shown in FIG. 7, lubricant passageways 730 are included in spring retainer plate mount configuration 700. Lubricant passageways 730 may include a supply line and a return line for a lubricant, such as oil for final drive assembly 226.

Figure 8:
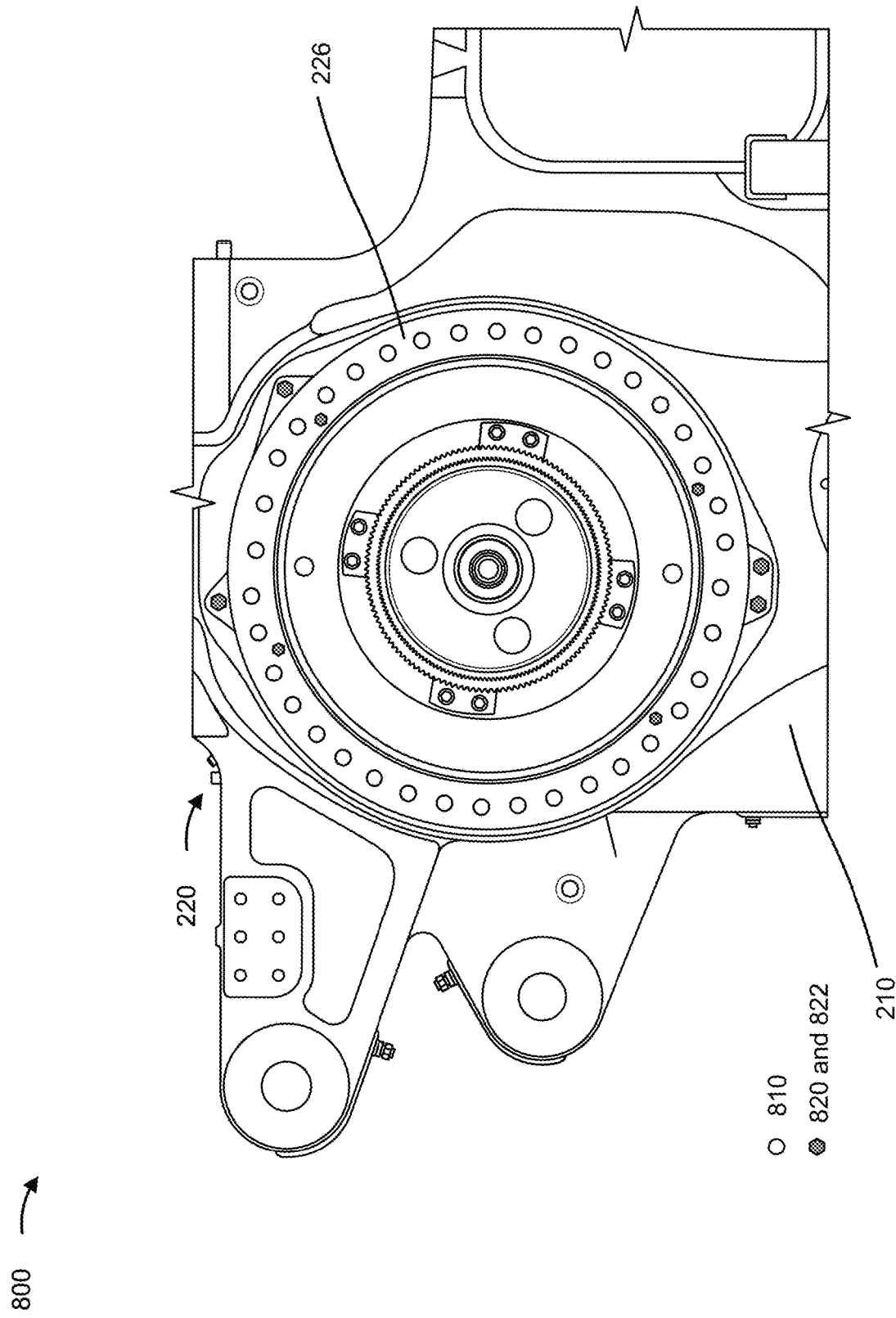

FIG. 8 includes a diagram of an example final drive mount configuration 800 of final drive assembly 226. Final drive mount configuration 800 includes an assembly bolt pattern 810 (e.g., that matches assembly bolt pattern 510, assembly bolt pattern 610, and assembly bolt pattern 710) and a final drive subassembly bolt pattern 820. Assembly bolt pattern 810 may receive assembly bolts to permit final drive assembly 226 to be assembled within motor drive assembly 220 and/or to be mounted to frame 210 (e.g., via assembly bolt pattern 322 of frame mount configuration 312).

As shown, final drive subassembly bolt pattern 820 includes a set of holes that are configured to receive final drive subassembly bolts 822 to enable final drive assembly to be attached to brake assembly 224 (e.g., without assembly bolts being installed). Accordingly, final drive subassembly bolt pattern 820 may match a portion of brake subassembly bolt pattern 620.

Figure 9:
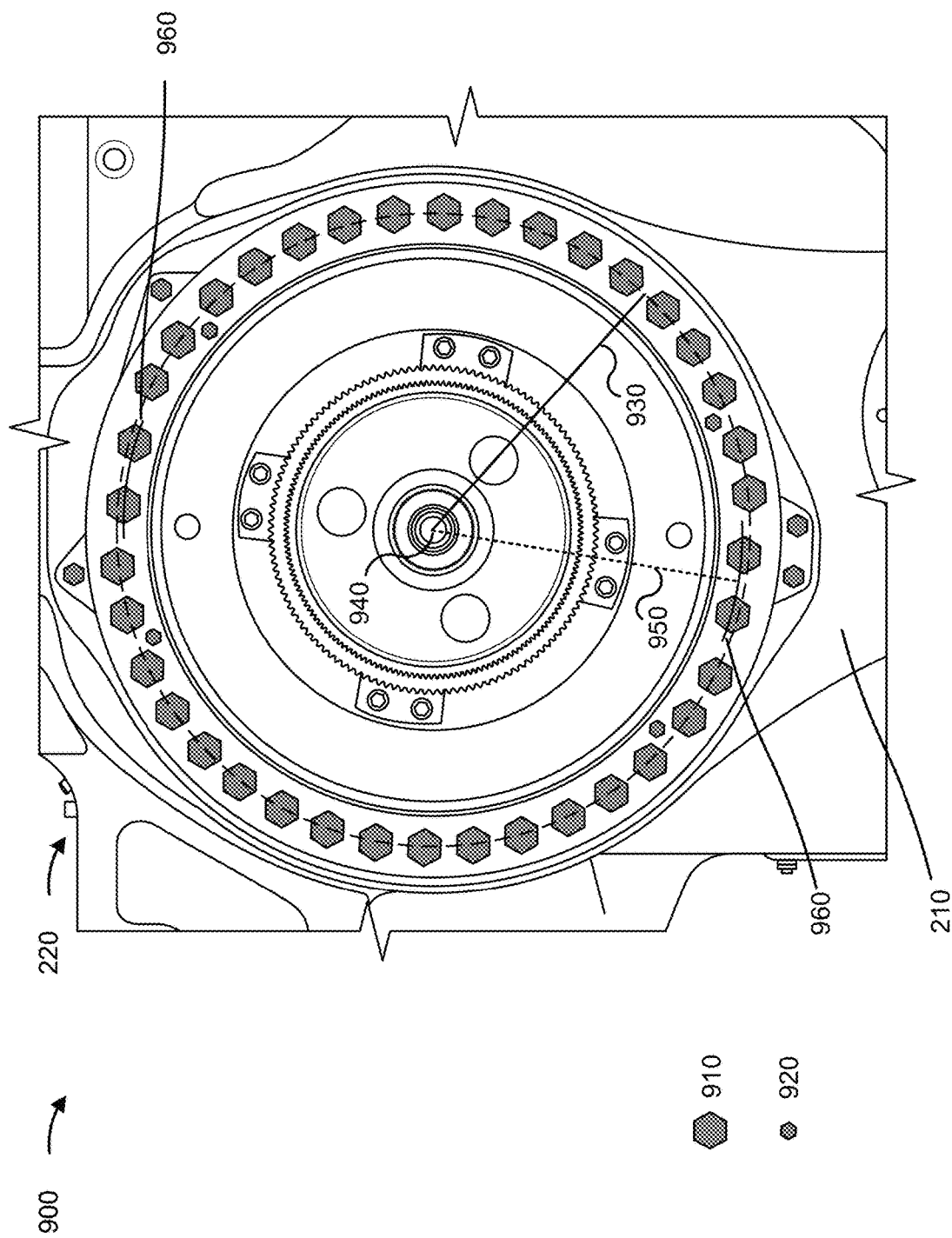

FIG. 9 includes a diagram of an example assembly bolt pattern 900 of motor drive assembly 220. As shown in FIG. 9, assembly bolts 910 and final drive subassembly bolts 920 are installed in order to mount motor drive assembly 220 to frame 210. As shown, a first set of holes of assembly bolt pattern 900 are positioned at a first distance 930 from a rotational axis 940 of motor drive assembly 220. A second set of holes of assembly bolt pattern 900 are positioned at a second distance 950 from the rotational axis 940 of motor drive assembly 220. Accordingly, there is an offset 960 between the first set of holes and the second set of holes.

The offset 960 allows for an increased available surface area of mounting surfaces of motor assembly 222, brake assembly 224, and/or final drive assembly 226 of motor drive assembly 220 for one or more fluid passageways described herein. For example, a lubricant passageway and/or hydraulic fluid passageway may be configured to be near or adjacent the second set of holes, such that the lubricant passageway and/or the hydraulic fluid passageway are angularly aligned (e.g., within a threshold angle, such as 5 degrees) of the second set of holes. In this way, the majority (e.g., 75%, 80%, 90%, and/or the like) of the total quantity of holes of assembly bolt pattern can be positioned at the same first distance 930 for improved strength and/or stress distribution, while a smaller portion of the holes of assembly bolt pattern can be positioned closer to rotational axis 940 to make room for fluid passageways through mounting surfaces of motor drive assembly 220.

As indicated above, FIGS. 5-9 are provided as one or more examples. Other examples may differ from what is described with regard to FIGS. 5-9.

Figure 10:
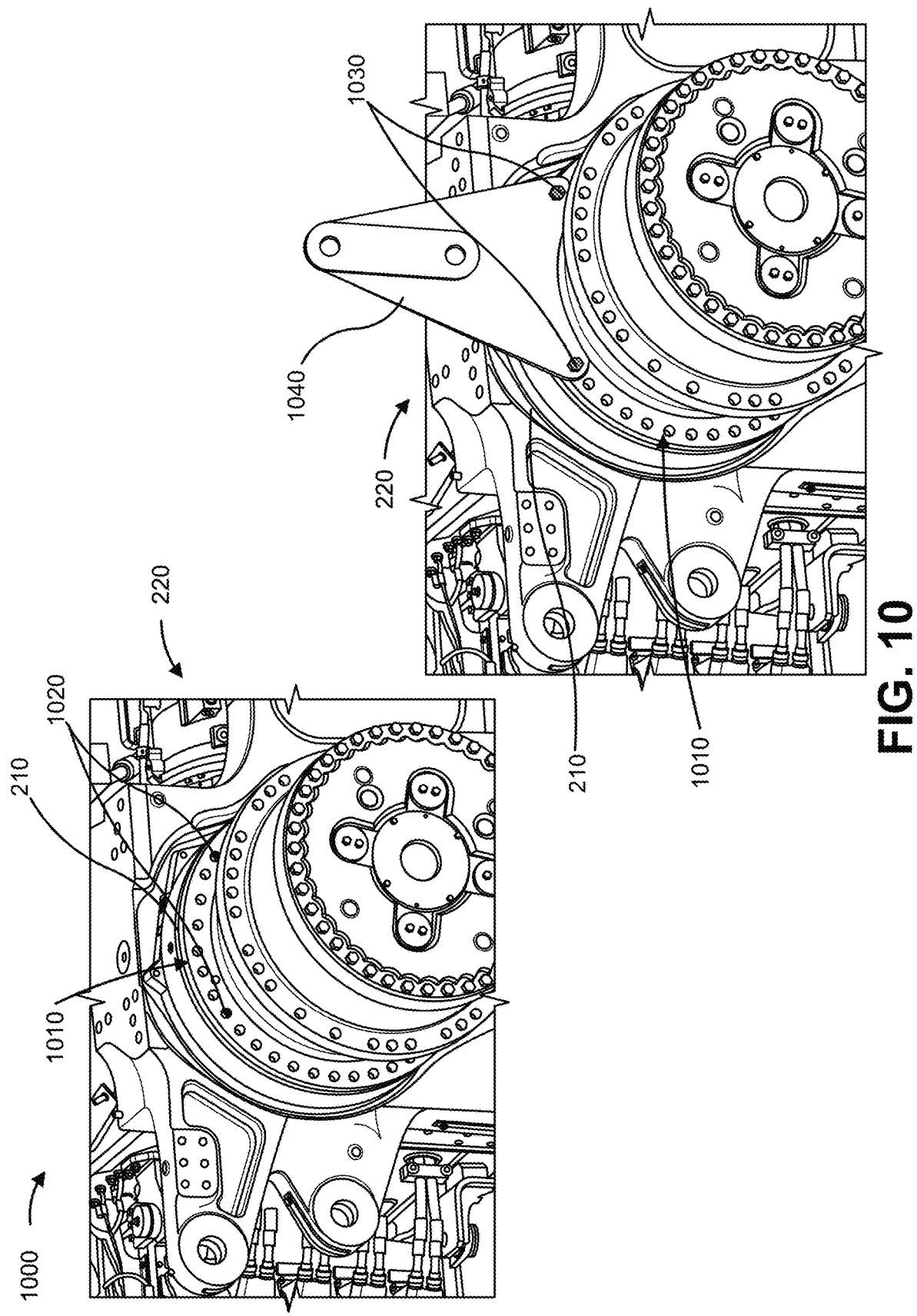
FIG. 10 is a diagram of an example implementation of mounting a motor drive assembly described herein.

FIG. 10 is a diagram of an example implementation 1000 of mounting a motor drive assembly 220 described herein. In example implementation 1000, an assembly bolt pattern 1010 (e.g., assembly bolt pattern 510, assembly bolt pattern 610, assembly bolt pattern 710, assembly bolt pattern 810) includes a set of threaded holes 1020 that can receive mounting mechanism bolts 1030 of a mounting mechanism 1040. Mounting mechanism 1040 may be any suitable device (e.g., a plate, a bracket, and/or the like) that is configured to mount motor drive assembly 220 to frame 210 and/or to enable motor drive assembly 220 to be maneuvered into position for mounting to frame 210 (e.g., using a crane, a lift, a boom, or other type of mechanical device).

In some implementations, threads of the set of threaded holes 1020 may have an inner thread diameter that is greater than a diameter of assembly bolts (e.g., assembly bolts 442 of FIG. 4) that are to be received through the set of threaded holes 1020 (e.g., after motor drive assembly 220 is mounted to frame 210 via assembly bolts received through other (e.g., non-threaded) holes of assembly bolt pattern 1010. Accordingly, the assembly bolts may bypass the threads (e.g., without having to be screwed into the threads) when mounting motor drive assembly 220 to frame 210 for use.

As indicated above, FIG. 10 is provided as an example. Other examples may differ from what is described with regard to FIG. 10.

INDUSTRIAL APPLICABILITY

The disclosed modular drive system 200 may be used with any machine that utilizes motor drive assemblies (e.g., for one or more ground engaging elements) to maneuver and/or drive the machine. As described herein, a motor drive assembly 220 (and/or correspondingly motor drive assembly 400) is modular in that motor drive assembly 220 may be installed as a whole (or single assembled part) to frame 105 of machine 100 (e.g., using assembly bolts) and/or assembled or mounted to frame 105 as individual parts (e.g., using sets of subassembly bolts). Additionally, or alternatively, according to an assembly bolt pattern and various sets of subassembly bolt patterns, motor drive assembly 220 can be uninstalled as a whole (or single part) and/or disassembled in a modular manner from machine 100. For example, final drive assembly 430 may be individually removed from brake assembly 420 by removing final drive subassembly bolts 432, while brake assembly 420 and motor assembly 410 may remain mounted to a frame via brake subassembly bolts 422 and/or motor subassembly bolts 412. As another example, final drive assembly 430 and brake assembly 420 may be removed together by keeping final drive subassembly bolts 432 in place and removing brake subassembly bolts 422 (and/or spring retainer plate bolts) from motor assembly 410, while motor assembly 410 may remain mounted to the frame via motor subassembly bolts 412. Such modular assembly enables relatively easy access to the individual parts for maintenance, mounting, and/or the like.

Subassembly bolts and/or subassembly bolt patterns as described herein may allow for an assembly bolt pattern that requires fewer assembly bolts (e.g., less than 40 assembly bolts). As described herein, subassembly bolts may be smaller than assembly bolts. For example, subassembly bolts may be approximately 10 to 14 millimeters (mm) in diameter (e.g., M10, M12, M14, and/or the like) and assembly bolts may be approximately 24 to 36 mm in diameter (e.g., M24, M30, M36 bolts, and/or the like). Accordingly, the relatively smaller size of the subassembly bolts may allow for relative ease or simplicity of installation (e.g., by requiring less torque or power to install the bolts) while the relatively larger size of the assembly bolts may allow for improved strength and security (e.g., to withstand higher amounts of torque during use).

Furthermore, the subassembly bolts may maintain (and/or improve) a strength and durability of an installed motor drive assembly 220 relative to previous techniques, while reducing a quantity of larger assembly bolts. Such a reduction of larger assembly bolts can increase one or more available surface areas of mounting surfaces of the frame mount configurations 312, motor housing 414 (e.g., motor assembly flange 416), brake housing 424, and/or final drive flange 434 that can be used for fluid passageways (e.g., lubricant passageways, coolant passageways, and/or hydraulics passages) to circulate, supply, or withdraw fluids to motor drive assembly 220.

Moreover, modular drive system 200 may be configured from a limited number of interchangeable components. For example, modular drive system 200 may permit a same machine (e.g., machine 100) to be assembled or configured and/or a same performance of a same machine to be achieved using a single motor drive assembly 220. As described herein, modular drive system 200 may be configured with a set of inverted frame mount configurations 312 that allow a same type of motor drive assembly 220 to be mounted to both sides of machine 100 without having to adjust or reconfigure connections to the motor drive assemblies 220. Therefore, different motor drive assemblies do not have to be designed to fit specific frame mounting configurations defined by locations of frame mount configurations 312 on the frame (e.g., so that rotational outputs from the motor drive assemblies 220 can be synchronized without having to electronically or mechanically be reconfigured). In this way, requirements for custom design, creation, and manufacturing of motor drive assemblies 220 and/or other components of modular drive system 200 (e.g., motor assemblies 222, brake assemblies 224, final drive assemblies 226, and/or the like) may be reduced for a given frame design of modular drive system 200, which is to be uniform across a plurality of different implementations or uses.

Furthermore, because a motor housing includes a terminal block 228 which enables connection of high voltage cables to an inverter of machine 100, a frame 210 of modular drive system 200 may include access opening 230 to allow easy access to terminal block 228 for servicing by a user. Additionally, with the same type of motor drive assembly (and/or motor assembly) for both a left-side motor and a right-side motor, disconnection of the cables is simplified to enable removal of motor assembly 222 from frame 210 without removing other components of the machine (e.g., due to the other components blocking user access to terminal blocks 228).

What is claimed is:

1. A motor drive assembly for a machine, the motor drive assembly comprising:
- a motor assembly that includes a motor housing with a motor subassembly bolt pattern,
  - wherein the motor subassembly bolt pattern permits the motor assembly to be fastened to a frame of the machine with motor subassembly bolts;
- a brake assembly that includes a brake housing with a brake subassembly bolt pattern,
  - wherein a first portion of the brake subassembly bolt pattern matches a first portion of the motor subassembly bolt pattern to permit brake subassembly bolts to be received via the first portion of the brake subassembly bolt pattern and the first portion of the motor subassembly bolt pattern; and
- a final drive assembly that includes a final drive flange with a final drive subassembly bolt pattern,
  - wherein a portion of the final drive subassembly bolt pattern matches a second portion of the brake subassembly bolt pattern to permit final drive subassembly bolts to be received via the second portion of the brake subassembly bolt pattern and the portion of the final drive subassembly bolt pattern, and
  - wherein one or more of:
    - the motor subassembly bolt pattern, the brake subassembly bolt pattern, and the final drive subassembly bolt pattern are configured to enable both:
      - the motor assembly, the brake assembly, and the final drive assembly to be individually mechanically coupled with the frame, and
      - a combination of the motor assembly, the brake assembly, and the final drive assembly to be mounted to the frame,
    - the motor subassembly bolt pattern is configured to receive the motor subassembly bolts to enable both:
      - the motor assembly to be mounted to the frame before the brake assembly is fastened to the motor assembly via the brake subassembly bolts, and
      - the motor assembly to be mounted to the frame after the brake assembly is fastened to the motor assembly via the brake subassembly bolts,
    - the brake subassembly bolt pattern is configured to receive the brake subassembly bolts to enable both:
      - the brake assembly to be mounted to the motor assembly before the motor assembly is mounted to the frame via the motor subassembly bolts, and
      - the brake assembly to be mounted to the motor assembly after the motor assembly is mounted to the frame via the motor subassembly bolts, or
    - the final drive subassembly bolt pattern is configured to receive the final drive subassembly bolts to enable both:
      - the final drive assembly to be mounted to the brake assembly before the brake assembly is mounted to the motor assembly via the brake subassembly bolts, and
      - the final drive assembly to be mounted to the brake assembly after the brake assembly is mounted to the motor assembly via the brake subassembly bolts.

2. The motor drive assembly of claim 1, wherein the motor subassembly bolt pattern, the brake subassembly bolt pattern, and the final drive subassembly bolt pattern are configured to enable both:
- the motor assembly, the brake assembly, and the final drive assembly to be individually mechanically coupled with the frame, and
- the combination of the motor assembly, the brake assembly, and the final drive assembly to be mounted to the frame.

3. The motor drive assembly of claim 1, wherein the motor subassembly bolt pattern is configured to receive the motor subassembly bolts to enable both:
- the motor assembly to be mounted to the frame before the brake assembly is fastened to the motor assembly via the brake subassembly bolts, and
- the motor assembly to be mounted to the frame after the brake assembly is fastened to the motor assembly via the brake subassembly bolts.

4. The motor drive assembly of claim 1, wherein the brake subassembly bolt pattern is configured to receive the brake subassembly bolts to enable both:
- the brake assembly to be mounted to the motor assembly before the motor assembly is mounted to the frame via the motor subassembly bolts, and
- the brake assembly to be mounted to the motor assembly after the motor assembly is mounted to the frame via the motor subassembly bolts.

5. The motor drive assembly of claim 1, wherein the final drive subassembly bolt pattern is configured to receive the final drive subassembly bolts to enable both:
- the final drive assembly to be mounted to the brake assembly before the brake assembly is mounted to the motor assembly via the brake subassembly bolts, and
- the final drive assembly to be mounted to the brake assembly after the brake assembly is mounted to the motor assembly via the brake subassembly bolts.

6. The motor drive assembly of claim 1, wherein the frame, the motor housing, the brake housing, and the final drive flange include a same assembly bolt pattern configured to receive assembly bolts for mounting the motor drive assembly to the frame for use.

7. The motor drive assembly of claim 6, wherein a first set of holes of the assembly bolt pattern are positioned to be a first distance from a rotational axis of the motor drive assembly, and
- wherein a second set of holes of the assembly bolt pattern are positioned to be a second distance from the rotational axis of the motor drive assembly,
  - wherein one or more of the second set of holes are holes are angularly aligned, relative to the rotational axis, with a fluid passageway of the motor drive assembly and the first set of holes are not angularly aligned with the fluid passageway.

8. The motor drive assembly of claim 7, wherein the first distance is longer than the second distance.

9. The motor drive assembly of claim 7, wherein the first set of holes comprise at least eighty percent of a total quantity of holes determined from a combination of the first set of holes and the second set of holes.

10. The motor drive assembly of claim 7, wherein one or more of the first set of holes have:
- threads to secure mounting mechanism bolts associated with a mounting mechanism that is capable of maneuvering the motor drive assembly, and
- an inner thread diameter, associated with the threads, that is greater than a diameter of the assembly bolts to enable the assembly bolts to bypass the threads for mounting the motor drive assembly for use.

11. A motor drive assembly for a machine, the motor drive assembly comprising:
   a motor assembly that includes a motor housing with a motor subassembly bolt pattern,
      wherein the motor subassembly bolt pattern permits the motor assembly to be fastened to a frame of the machine with motor subassembly bolts;
   a brake assembly that includes a brake housing with a brake subassembly bolt pattern,
      wherein a first portion of the brake subassembly bolt pattern matches a first portion of the motor subassembly bolt pattern to permit brake subassembly bolts to be received via the first portion of the brake subassembly bolt pattern and the first portion of the motor subassembly bolt pattern; and
   a final drive assembly that includes a final drive flange with a final drive subassembly bolt pattern,
      wherein a portion of the final drive subassembly bolt pattern matches a second portion of the brake subassembly bolt pattern to permit final drive subassembly bolts to be received via the second portion of the brake subassembly bolt pattern and the portion of the final drive subassembly bolt pattern,
      wherein one or more of the frame, the motor housing, the brake housing, or the final drive flange include an assembly bolt pattern,
      wherein a first set of holes of the assembly bolt pattern are positioned to be a first distance from a rotational axis of the motor drive assembly,
      wherein a second set of holes of the assembly bolt pattern are positioned to be a second distance from the rotational axis of the motor drive assembly, and
      wherein the first set of holes are not angularly aligned with a fluid passageway of the motor drive assembly.

12. The motor drive assembly of claim 11, wherein each of the frame, the motor housing, the brake housing, and the final drive flange includes the assembly bolt pattern.

13. The motor drive assembly of claim 11, wherein the assembly bolt pattern is configured to receive assembly bolts for mounting the motor drive assembly to the frame for use.

14. The motor drive assembly of claim 11, wherein one or more of the second set of holes are holes are angularly aligned, relative to the rotational axis, with the fluid passageway.

15. The motor drive assembly of claim 11, wherein the first distance is longer than the second distance.

16. The motor drive assembly of claim 11, wherein the first set of holes comprise at least eighty percent of a total quantity of holes determined from a combination of the first set of holes and the second set of holes.

17. The motor drive assembly of claim 11, wherein one or more of the first set of holes have threads to secure mounting mechanism bolts associated with a mounting mechanism that is capable of maneuvering the motor drive assembly.

18. The motor drive assembly of claim 17,
   wherein the assembly bolt pattern is configured to receive assembly bolts for mounting the motor drive assembly to the frame for use, and
   wherein one or more of the first set of holes have an inner thread diameter, associated with the threads, that is greater than a diameter of the assembly bolts to enable the assembly bolts to bypass the threads for mounting the motor drive assembly for use.

19. A motor drive assembly for a machine, the motor drive assembly comprising:
   a motor assembly that includes a motor housing with a motor subassembly bolt pattern,
      wherein the motor subassembly bolt pattern permits the motor assembly to be fastened to a frame of the machine;
   a brake assembly that includes a brake housing with a brake subassembly bolt pattern,
      wherein a first portion of the brake subassembly bolt pattern matches a first portion of the motor subassembly bolt pattern; and
   a final drive assembly that includes a final drive flange with a final drive subassembly bolt pattern,
      wherein a portion of the final drive subassembly bolt pattern matches a second portion of the brake subassembly bolt pattern, and
      wherein the motor subassembly bolt pattern, the brake subassembly bolt pattern, and the final drive subassembly bolt pattern are configured to enable both:
         the motor assembly, the brake assembly, and the final drive assembly to be individually mechanically coupled with the frame, and
         a combination of the motor assembly, the brake assembly, and the final drive assembly to be mounted to the frame.

20. The motor drive assembly of claim 19,
   wherein the frame, the motor housing, the brake housing, and the final drive flange include a same assembly bolt pattern configured to receive assembly bolts for mounting the motor drive assembly to the frame for use,
   wherein a first set of holes of the assembly bolt pattern are positioned to be a first distance from a rotational axis of the motor drive assembly,
   wherein a second set of holes of the assembly bolt pattern are positioned to be a second distance from the rotational axis of the motor drive assembly, and
   wherein one or more of the second set of holes are holes are angularly aligned, relative to the rotational axis, with a fluid passageway of the motor drive assembly and the first set of holes are not angularly aligned with the fluid passageway.

\* \* \* \* \*